(12) United States Patent
Masschelein et al.

(10) Patent No.: US 11,960,173 B1
(45) Date of Patent: Apr. 16, 2024

(54) SWITCHABLE PANEL WITH TENSION CONTROL COMPONENTS

(71) Applicant: APPLE INC., Cupertino, CA (US)

(72) Inventors: Peter F. Masschelein, Campbell, CA (US); Yuan Chen, San Jose, CA (US); Derek C. Scott, Melbourne (AU)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/675,475

(22) Filed: Feb. 18, 2022

Related U.S. Application Data

(63) Continuation of application No. 16/751,636, filed on Jan. 24, 2020, now Pat. No. 11,287,701.

(60) Provisional application No. 62/806,088, filed on Feb. 15, 2019.

(51) Int. Cl.
*G02F 1/1339* (2006.01)
*G02F 1/1345* (2006.01)

(52) U.S. Cl.
CPC ...... *G02F 1/13394* (2013.01); *G02F 1/13452* (2013.01)

(58) Field of Classification Search
CPC .................................................. G02F 1/13394
USPC ........................................................... 349/33
See application file for complete search history.

(56) References Cited

U.S. PATENT DOCUMENTS

| | | | |
|---|---|---|---|
| 8,995,039 B2 | 3/2015 | Bartug et al. | |
| 9,694,740 B2 | 7/2017 | Frey et al. | |
| 11,287,701 B1* | 3/2022 | Masschelein | G02F 1/13394 |
| 2002/0039167 A1* | 4/2002 | Kitahora | G02F 1/1347 |
| | | | 349/186 |
| 2010/0149463 A1* | 6/2010 | Shimizu | G02F 1/13394 |
| | | | 349/155 |
| 2017/0256210 A1 | 9/2017 | Kato | |
| 2021/0208445 A1* | 7/2021 | Ikezawa | B32B 27/36 |

FOREIGN PATENT DOCUMENTS

| | | | |
|---|---|---|---|
| CN | 102116958 B | 9/2012 | |
| WO | 2015185428 A1 | 12/2015 | |
| WO | 2017135182 A1 | 8/2017 | |
| WO | WO-2020093541 A1 * | 5/2020 | G02F 1/13392 |

* cited by examiner

*Primary Examiner* — Edward J Glick
*Assistant Examiner* — William D Peterson
(74) *Attorney, Agent, or Firm* — Young Basile Hanlon & MacFarlane, P.C.

(57) ABSTRACT

A switchable panel is described that includes exterior layers, a switchable component disposed between the exterior layers, a lamination frame extending from outer edges of the switchable component to outer edges of the panel between the exterior layers, and spacers embedded within the lamination frame. The spacers are configured to prohibit the exterior layers from moving toward each other at the outer edges of the panel when a central portion of the panel experiences tension.

20 Claims, 7 Drawing Sheets

SWITCHABLE PANEL WITH TENSION CONTROL COMPONENTS

CROSS-REFERENCE TO RELATED APPLICATION(S)

This application is a continuation of U.S. patent application Ser. No. 16/751,636, filed on Jan. 24, 2020, which claims the benefit of U.S. Provisional Application No. 62/806,088, filed on Feb. 15, 2019. The content of the foregoing application is incorporated herein by reference in its entirety for all purposes.

TECHNICAL FIELD

This disclosure relates generally to switchable panels and in particular to switchable panels used to control light transmission through laminated glass or glazing.

BACKGROUND

Panels or glazings, such as those made of glass, polycarbonate, plastic, composite, or other light-transmissive material, have optical properties that determine functionality of the panel, such as panel transmittance. Switchable materials, such as flexible liquid crystal (LC) films, can be used in combination with other materials within a laminated glazing or panel to selectively modify various optical properties of the panel, such as to selectively provide a shield from sunlight or privacy within a vehicle cabin or office, thus serving as a switchable panel. The lamination process to form a switchable panel inclusive of the LC film can subject the LC film to potential defects that negatively impact both aesthetics and function of the switchable panel.

SUMMARY

One aspect of the disclosed embodiments is a panel that includes exterior layers, lamination layers extending between the exterior layers to outer edges of the panel, a switchable component extending between the lamination layers and having a switchable component height, and a tension control component that prohibits a change of greater than ten percent to the switchable component height when tension is applied to the panel.

Another aspect of the disclosed embodiments is a panel that includes exterior layers, lamination layers extending between the exterior layers to outer edges of the panel, a switchable component extending between the lamination layers and having a switchable component height, an electrical connection extending from an edge of the switchable component along at least one of the lamination layers and beyond an outer edge of the panel, the electrical connection providing control signals to the switchable component, and a lamination frame extending from outer edges of the switchable component to the outer edges of the panel between the lamination layers. The lamination frame is formed from a material that prohibits tension and compression during lamination from causing a change in the switchable component height greater than ten percent.

Another aspect of the disclosed embodiments is a panel that includes panel exterior layers, lamination layers extending between the panel exterior layers to outer edges of the panel, and a switchable component extending between the lamination layers and having a switchable component height. The switchable component includes switchable component exterior layers, a liquid crystal (LC) layer extending between the switchable component exterior layers and having a cell gap height that forms a portion of the switchable component height, and spacers disposed within the LC layer that extend across the full cell gap height and are bonded at opposing ends to the LC exterior layers to prohibit tension and compression during lamination from causing a change in the cell gap height greater than ten percent.

Another aspect of the disclosed embodiments is a panel that includes exterior layers, a switchable component disposed between the exterior layers, a lamination frame extending from outer edges of the switchable component to outer edges of the panel between the exterior layers, and spacers embedded within the lamination frame. The spacers are configured to prohibit the exterior layers from moving toward each other at the outer edges of the panel when a central portion of the panel experiences tension.

Another aspect of the disclosed embodiments is a panel that includes exterior layers, lamination layers disposed between the exterior layers and extending to outer edges of the panel, a switchable component disposed between the lamination layers, and spacers adhered to an interior surface of the switchable component. Positions of the spacers prohibit the exterior layers from moving toward each other at the outer edges of the panel when a central portion of the panel experiences tension. The panel also includes a lamination frame extending from outer edges of the switchable component to the outer edges of the panel between the lamination layers. The lamination frame is formed from a material having a stiffness greater than a stiffness of a material that forms the lamination layers.

Another aspect of the disclosed embodiments is a panel that includes panel exterior layers and a switchable component disposed between the panel exterior layers. The switchable component includes switchable component exterior layers, a liquid crystal (LC) interior layer including a viscous material and disposed between the switchable component exterior layers, and spacers anchored within the LC interior layer. The viscous material flows around the spacers.

DETAILED DESCRIPTION

Switchable panels for use in vehicle cabins or office buildings can be formed using lamination of glass or other light-transmissive materials with light-transmissive switchable devices or components, such as suspended particle devices, electrochromic devices, polymer dispersed liquid crystal (LC) devices, and guest host liquid crystal (LC) devices. Avoiding defects that become visible during use of the switchable panel requires an overall height of the switchable component to be maintained both during and after the lamination process, that is, defect-free functionality requires managing both compressive and tensile forces applied to the switchable component during temperature and pressure cycling experienced during the lamination and glazing process.

Minimizing height changes to a switchable component caused by compressive forces can be accomplished using spacers that float, for example, within a liquid crystal (LC) layer between exterior layers that contain the LC layer. Minimizing height changes caused by tensile forces during lamination and curing can require additional tension control components. These tension control components can include lamination frames that surround the switchable component, changes in height to layers of the switchable component and/or the panel, changes in width of the overall switchable component, changes to materials forming various lamination components, and bonding or adhesion of the spacers within the switchable component to its exterior layers. Other tension control components are also described below. The tension control components can be used either individually or in various combinations to best minimize height changes of the switchable component caused by tensile forces and thus to minimize defects.

Figure 1:
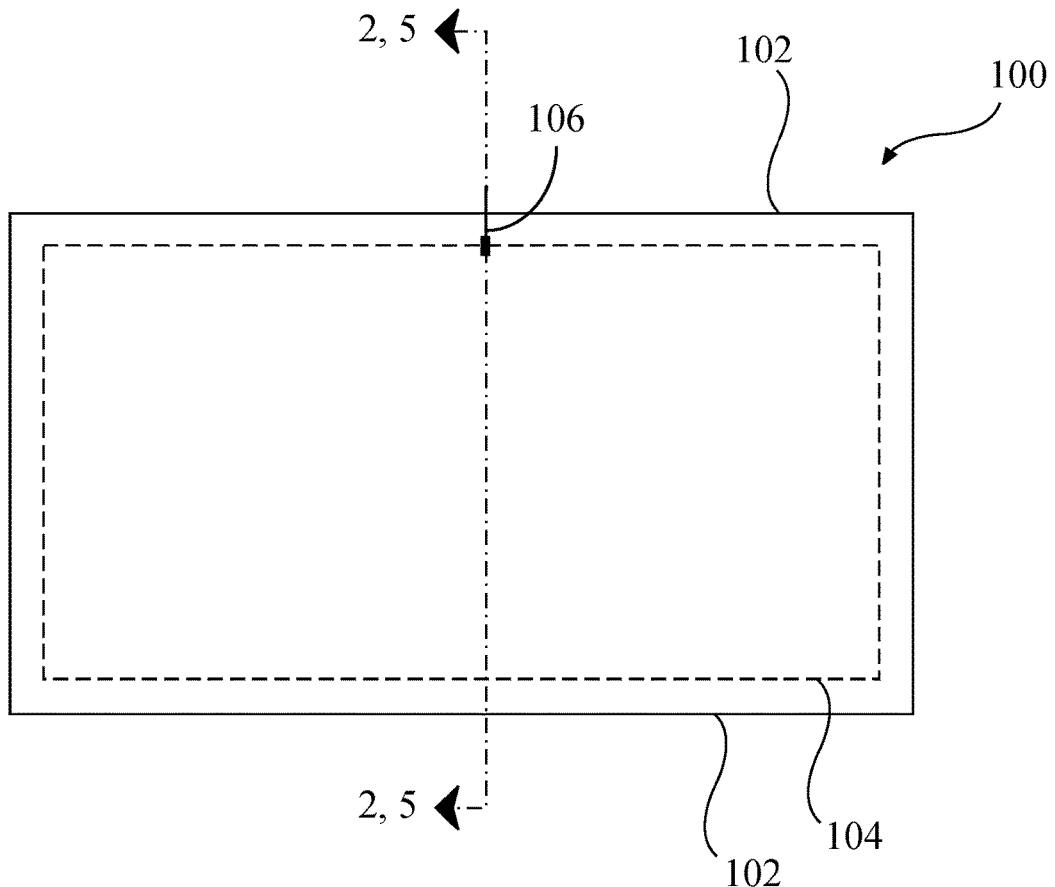
FIG. 1 is a plan view illustration showing a switchable panel.

FIG. 1 is a plan view illustration showing a switchable, laminated glazing or panel, designated generally as panel 100. The panel 100 may be used, for example, in a vehicle windshield, side window, sunroof, backlight, or in another application, such as in building construction as an office window. The panel 100 can include various internal layers having optical properties, safety properties, and adhesive properties in a stack-up further described below. The panel 100 can have outer edges 102 and can include a switchable component such as an LC film 104 designated in dotted line to indicate its internal position within the panel 100. The LC film 104 can extend near or adjacent to the outer edges 102 of the panel 100 without reaching the outer edges 102 as shown. In other embodiments, described below, the LC film 104 can extend to the outer edges 102 of the panel 100. The panel 100 can also include an edge treatment (not shown) suitable for allowing the panel to be held, for example, in a frame (not shown).

The panel 100 can include an electrical connection 106. The electrical connection 106 is connected to a power source and/or to a controller to provide electrical power and/or control signals to the LC film 104 that is incorporated in the panel 100. Electrical power and/or control signals passing through the electrical connection 106 to the LC film 104 can be used to modify a degree of light transmission through the panel 100. For example, an amount of light transmitted through the panel 100 may be controllable by a voltage of a control signal delivered to the LC film 104 by the electrical connection 106, producing, for example, a tint or darkening of the panel 100 as perceived by an occupant inside a vehicle or a pedestrian outside the vehicle. The electrical connection 106 may incorporate transparent electrodes, such as indium tin oxide (ITO) electrodes, to allow control of the variable light-transmissive properties of the LC film 104 within the panel 100.

Figure 2:
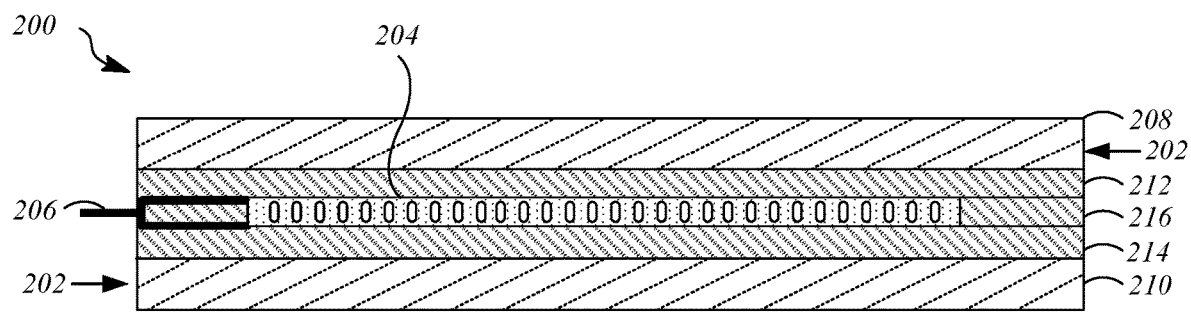
FIG. 2 is a cross-sectional view of the panel of FIG. 1 taken along line 2-2 of FIG. 1.

FIG. 2 is a cross-sectional view of the panel 100 of FIG. 1 taken along line 2-2 of FIG. 1. For clarity, the cross-section in FIG. 2 will be described as panel 200. The panel 200 includes outer edges 202, an embedded switchable component, e.g. LC film 204, that does not extend to the outer edges 202 of the panel 200, and an electrical connection 206 similar to those described in reference to FIG. 1. The panel 200 also includes exterior layers 208, 210, lamination layers 212, 214, and a lamination frame 216.

The LC film 204 is generally thin, having a height, for example, between 10 microns and 30 microns (micrometers). Construction of the LC film 204 is described further below in respect to FIGS. 3A to 3C. The LC film 204 can be laminated between the exterior layers 208, 210 of the panel 200 using heat, pressure, and adhesion of the lamination layers 212, 214 and the lamination frame 216 to the exterior layers 208, 210 according to a traditional lamination and curing process, for example, using vacuum bagging and autoclaving. Other lamination processes to adhere the components are also possible.

The exterior layers 208, 210 can be formed from glass or polycarbonate. Other exterior materials are also possible, with the exterior materials generally being solid in form as well as having light-transmissive material properties. The exterior layers 208, 210 can also have strength and safety properties, such as anti-shatter or bulletproof-type construction.

The lamination layers 212, 214 and the lamination frame 216 can be formed from polyvinyl butyral (PVB) or polyethylene terephthalate (PET). Other lamination materials are also possible, with the lamination materials (e.g., the lamination layers 212, 214 and the lamination frame 216) generally having light-transmissive, heat-softening, and adhesive-bonding material properties.

The lamination layers 212, 214 can extend the length of the exterior layers 208, 210 as shown. The lamination frame 216 can extend from outer edges of the embedded LC film 204 to the outer edges 202 of the panel 200 between the lamination layers 212, 214 as shown. A width of the lamination frame 216 can be, for example, 10 mm to 30 mm. Thus, a width of the lamination frame 216 can be hundreds or thousands of times a height of the LC film 204 (i.e., when the height of the LC film 204 is between 10 microns and 30 microns). The lamination frame 216 can protect edges of the LC film 204 from damage by environmental elements and protect surfaces of the LC film 204 from tensile and compressive forces during lamination processes by resisting any bending of the exterior layers 208, 210 at the outer edges 202 of the panel 200.

Figure 3A:
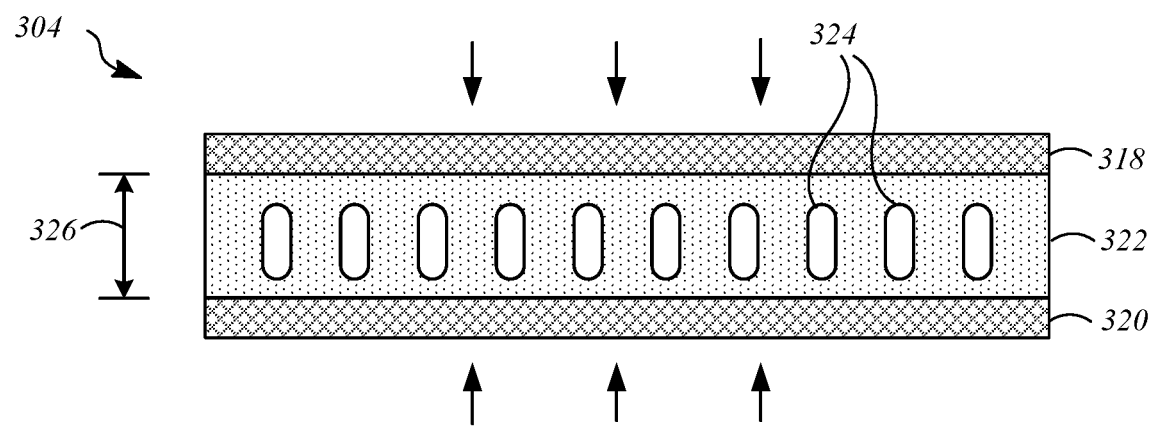
FIGS. 3A and 3B are detail views of an LC film embedded in the panel of FIG. 2.
Figure 3B:
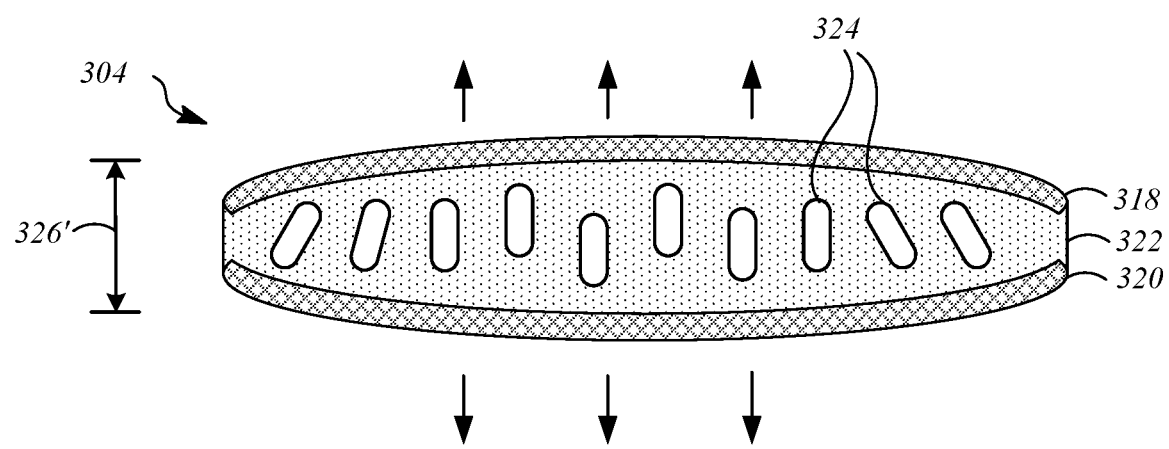

FIGS. 3A and 3B are detail views of the LC film 204 embedded in the panel 200 of FIG. 2. For clarity, the detail views in FIGS. 3A and 3B will be described as LC film 304. The LC film 304 includes exterior layers 318, 320, a liquid crystal (LC) layer 322, and spacers 324. The distances between the exterior layers 318, 320 are denoted as cell gaps 326, 326' to denote height differences in the cell gaps 326, 326' in FIGS. 3A and 3B.

The exterior layers 318, 320 can be formed, for example, of PVB or PET lined with an ITO coating or other type of electrode-based coating or framework. Other light-transmissive materials for forming the exterior layers 318, 320 are also possible. The exterior layers 318, 320 are designed to both electrically communicate with and contain the LC layer 322 either with or without an additional seal (not shown). The spacers 324 are disposed, generally free floating, within the LC layer 322 and can be formed, for example, of glass, polycarbonate, or other substantially solid materials with light-transmissive properties.

As best shown in FIG. 3A, the spacers 324 can be sized and shaped to prohibit compressive forces (e.g., designated by arrows heading toward each of the exterior layers 318, 320 in FIG. 3A) from collapsing the cell gap 326 more than ten percent of its overall height during lamination or use of the LC film 304. That is, the cell gap 326 has a design-intent height sufficient for function of the LC film 304 and avoidance of defect visibility during operation of the LC film 304, changes to which may risk occurrence of defects. Though shown in FIGS. 3A and 3B as ovular, other shapes for the spacers 324 such as circular, square, rectangular, etc. are also possible. As best shown in FIG. 3B, use of the free-floating spacers 324 alone can fail to prohibit tensive forces (e.g., designated by arrows heading away from each of the exterior layers 318, 320 in FIG. 3B) from increasing a height of the cell gap 326' during lamination.

In comparing FIGS. 3A and 3B, the cell gap 326' can increase to a value between five percent and twenty-five percent larger than the cell gap 326 due to tension experienced during lamination. When the expanded cell gap 326' increases in height over the design-intent cell gap 326 in this manner, defects can form in the LC film 304. For example, discolored areas, dark splotches, variations in shading, or other visible deformities can occur if the expanded cell gap 326' is more than ten percent greater than the design-intent cell gap 326. The expanded call gap 326' of FIG. 3B can be caused by the LC film 304 experiencing tension due to hardening and softening of components, such as the lamination layers 212, 214 within the panel 200 of FIG. 2 during the lamination process. Any defects that may occur generally have a symmetric geometric pattern due to the symmetric construction of the panel 200 and the symmetric application of tension and compression during lamination.

Figure 4A:
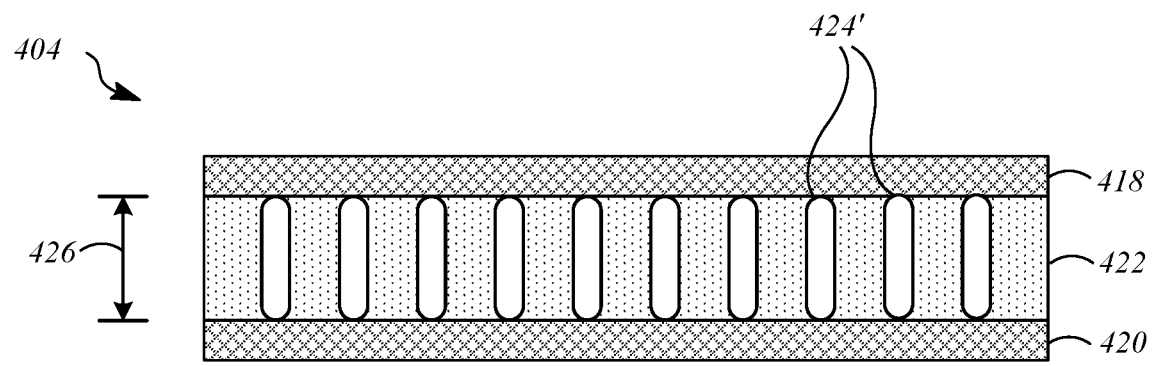
FIGS. 4A and 4B are detail views of the LC film of FIGS. 3A and 3B including various tension control components.
Figure 4B:
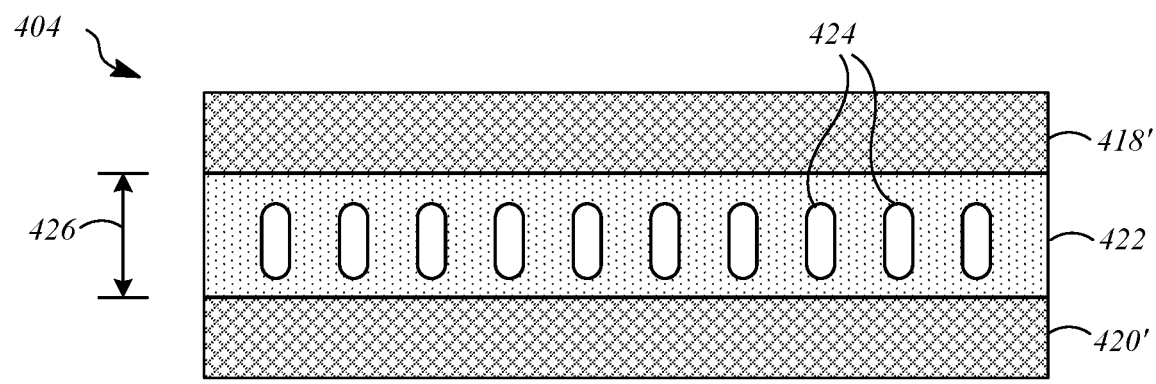

FIGS. 4A and 4B are detail views of the LC film 304 of FIGS. 3A and 3B including tension control components. For clarity, the detail views in FIGS. 4A and 4B will be described as LC film 404. The LC film 404 includes exterior layers 418, 420 in FIGS. 4A and 418', 420' in FIG. 4B, a liquid crystal (LC) layer 422, and spacers 424' in FIGS. 4A and 424 in FIG. 4B. The distance between the exterior layers 418, 420 is denoted as cell gap 426 which has a design-intent height conducive to avoiding visible defects in the LC film 404.

In FIG. 4A, the tension control component is the spacers 424' in that the spacers 424' include an adhesive or other bonding material (not shown) in addition to longer or larger bodies as shown. The spacers 424' are adhered or bonded at opposing ends to the exterior layers 418, 420 of the LC film 404 during manufacture of the LC film 404 so that neither tension nor compression will cause a change in a height of the LC gap 426 sufficient to generate defects in the LC film 404. Since the LC layer 422 is formed of a movable, or viscous, material that is able to flow around the bonded or secured spacers 424', the switchable properties of the LC film 404 are maintained. The secured or bonded spacers 424' are formed from glass, acrylic, photo-resistive, and/or inert materials that do not impact function of the LC film 404.

In FIG. 4B, the tension control component is a height or thickness increase of the exterior layers 418', 420' of the LC film 404 as compared to a height of the exterior layers 418, 420 shown in FIG. 4A. For example, by doubling or tripling the height of the exterior layers 418', 420' of the LC film 404, the LC film 404 becomes more rigid and is less likely to experience an increase in height of the cell gap 426 when under tension during lamination of the panel 200. For example, the increase in thickness of the exterior layers 418', 420' can be sufficient to prohibit tension and/or compression during lamination from causing more than a ten percent change in height of the cell gap 426.

As is true of the exterior layers 418, 420 of FIG. 4A, the taller or thicker exterior layers 418', 420' of FIG. 4B can be formed for example, of PVB, PET, or other light-transmissive material that is lined with an ITO coating or other type of electrode that allows electrical communication, for example, with the electrical connection 206 of the panel 200 of FIG. 2 when the LC film 404 is embedded within the panel 200 in a manner similar to that shown in FIG. 2.

FIGS. 5A, 5B, 5C, 5D, and 5E are cross-sectional views of the panel 100 of FIG. 1 taken along line 5-5 of FIG. 1 that describe various tension control components. For clarity, the cross-sectional views in FIGS. 5A to 5E will be described as panel 500. The panel 500 includes outer edges 502 and an embedded switchable component, e.g. LC film 504 in FIGS. 5A, 5B, 5D, and and LC film 504' in FIG. 5C. Though described as LC films 504, 504', other switchable component types such as suspended particle devices or electrochromic devices can be used as the embedded switchable component.

Figure 5A:
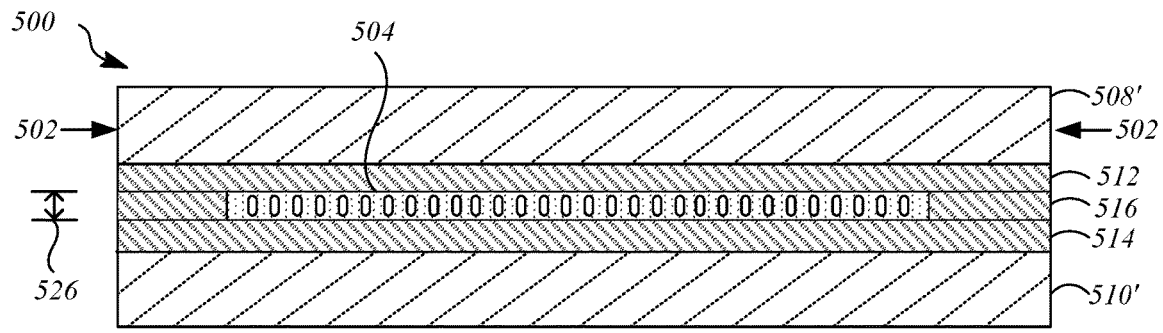
FIGS. 5A, 5B, 5C, 5D, and 5E are cross-sectional views of the panel of FIG. 1 taken along line 5-5 of FIG. 1 including various tension control components.
Figure 5B:
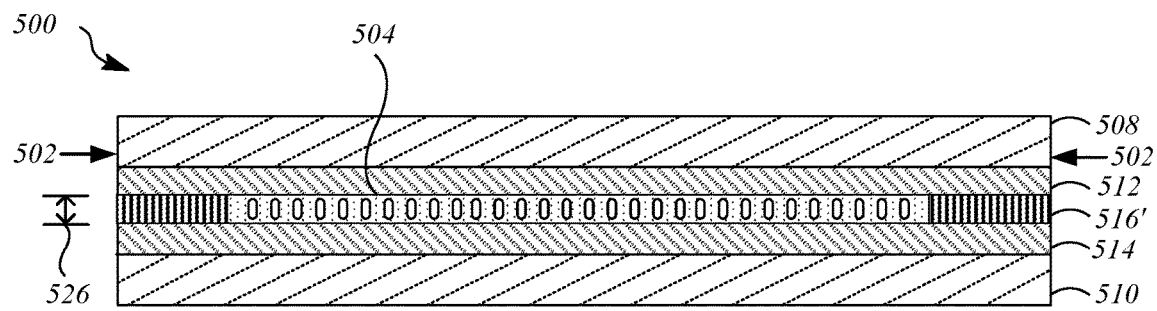
Figure 5C:
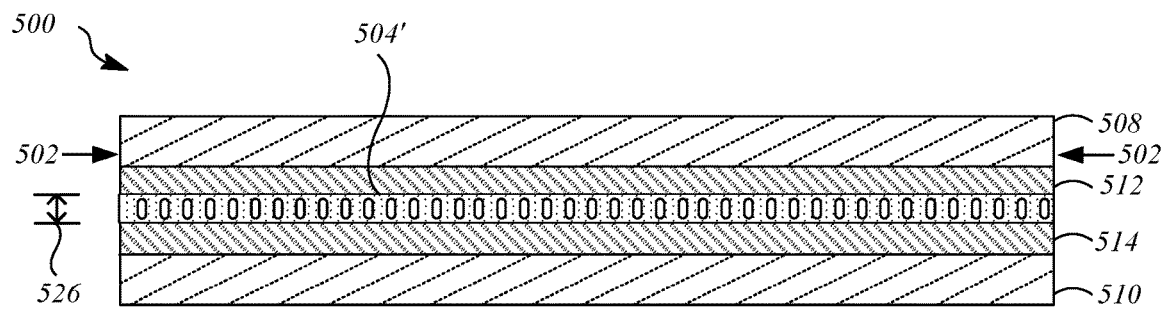
Figure 5D:
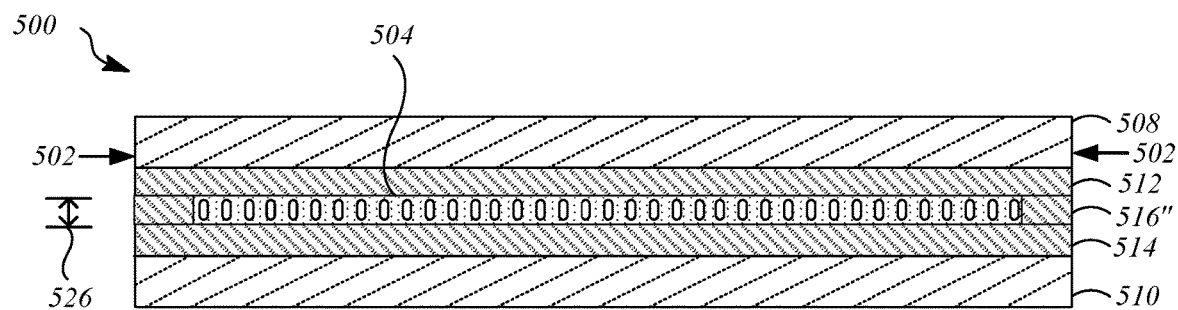
Figure 5E:
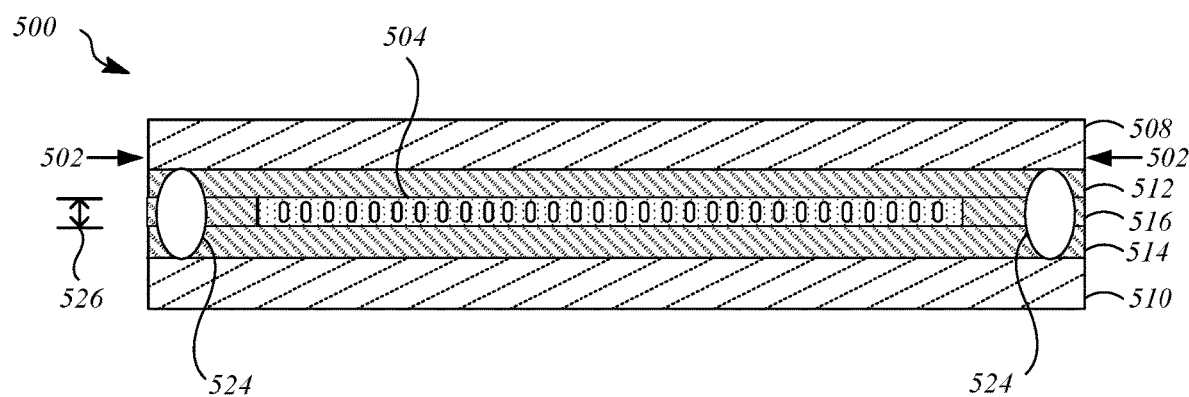

The panel 500 includes exterior layers 508, 510 in FIGS. 5B, 5C, 5D, and 5E and 508', 510' in FIG. 5A, lamination layers 512, 514, and lamination frame 516 in FIGS. 5A and 5E, 516' in FIGS. 5B, and 516" in FIG. 5D. Finally, the panel 500 includes spacers 524 in FIG. 5E. The distance between the exterior layers 508, 508' and 510, 510' is denoted as switchable component height 526 which has a design-intent height conducive to avoiding defects in the LC films 504, 504'. The construction of the similarly named components between FIG. 2 and FIGS. 5A to 5E is similar. Thus, mostly the differences between FIG. 2 and each of the FIGS. 5A to 5E will be highlighted below, with these differences directed to various tension control components that prohibit a defect-inducing change to the switchable component height 526 when tension is applied to the panel 500.

In FIG. 5A, the tension control component is a height or thickness increase of the exterior layers 508', 510' of the panel 500 as compared to a height of the exterior layers 508, 510 shown in FIGS. 5B, 5C, 5D, and 5E. For example, by adding ten to thirty percent to the height of the exterior layers 508', 510', the panel 500 becomes more rigid and is less likely to cause an increase in the switchable component height 526 when the panel 500 is under tension during lamination. For example, the increase in thickness of the exterior layers 508', 510' can be sufficient to prohibit tension and/or compression during lamination from causing more than a ten percent change in the switchable component height 526, avoiding defects in the LC film 504.

In FIG. 5B, the tension control component is a change in material used to form the lamination frame 516' as compared to the material used for the lamination layers 512, 514 and the lamination frames 516, 516" shown in FIGS. 5A, 5D, and 5E. That is, the lamination frame 516' and the lamination frames 516, 516" have different material properties as shown using different shading in the cross sections. For example, the lamination frame 516' can be formed from polyethylene terephthalate (PET) while the lamination frames 516, 516" are formed from polyvinyl butyral (PVB). A width of the lamination frame 516' can be, for example, 10 mm to 30 mm.

There are several benefits to using, for example, PET to form the lamination frame 516'. First, PET can have a greater material stiffness while undergoing pressure and temperature changes than PVB, allowing the lamination frame 516' to have a stiffness sufficient to prohibit tension and/or compression during lamination from causing more than a ten percent change in the switchable component height 526. The LC film 504 can also be formed from PET, for example, having PET-based exterior layers (e.g., such as the exterior layers 418, 420 of FIG. 4A). This allows a continuous layer of PET, that of the LC film 504 and the lamination frame 516', between the lamination layers 512, 514, thus reducing any point stresses that could occur due to material changes during lamination. Other lamination materials for the lamination frame 516' are also possible, with the lamination materials generally having both light-transmissive and adhesive-bonding material properties.

In FIG. 5C, the tension control component is an extension of the LC film 504' along a full length of the lamination layers 512, 514 as shown. In other words, the lamination frame 516 of FIG. 5A is eliminated, and an edge treatment or sealant (not shown) is used at outer edges of the LC film 504' to protect the LC film 504' from environmental elements. The full extension of the LC film 504' along the lamination layers 512, 514 to the outer edges 502 of the panel 500 allows a continuous material presence between the lamination layers 512, 514, such as a continuous layer of PET, that can reduce or eliminate any point stresses that occur due to material change locations during lamination of the panel 500, reducing or eliminating defects in the LC film 504' during lamination.

In FIG. 5D, the tension control component is a reduction in width of the lamination frame 516" for example, as compared to a width of the lamination frames 516, 516' of FIGS. 5A, 5B, and 5E. In one example, the lamination frame 516" can have a width between 1 mm and where the lamination frames 516, 516' have widths between 10 mm and 30 mm. In another example, the lamination frame 516" can have a width of approximately 5 mm where the lamination frames 516, 516" have widths of approximately 20 mm. Other widths for the lamination frames 516, 516', 516" are also possible.

Modification to the width of the lamination frame 516" is useful when a material forming the lamination frame 516" is the same as a material forming the lamination layers 514, 516. For example, if the lamination frame 516" and the lamination layers 512, 514 are both formed of PVB, the PVB could soften excessively and allow curvature of the exterior layers 508, 510 during the lamination process if the width of the lamination frame 516" were to exceed a threshold, the threshold depending on an overall size of the panel 500.

The narrower lamination frame 516' can still protect edges of the LC film 504 from damage by environmental elements. In combination with use of the narrower lamination frame 516", the LC film 504 can have an increased or greater width, and as described above in reference to FIG. 5C, a longer extension or width of the LC film 504 allows for a more continuous material property to be present between the lamination layers 512, 514 at the location of the LC film 504. In turn, the use of a singular material can reduce or eliminate any point stresses that occur due to material changes during lamination, reducing or eliminating defects during lamination along the face of the LC film 504.

In FIG. 5E, the tension control component is the spacers 524 disposed between exterior layers 508, 510 near the outer edges 502 of the panel 500. The spacers 524 can be sized and shaped to prohibit both compressive forces and tensive forces from causing changes to the switchable component height 526 of more than ten percent during lamination of the panel 500. The spacers 524 achieve this by prohibiting the outer edges 502 of the panel 500 from bending during lamination, as bending can cause tension (and/or compression) on the LC film 504. For example, the presence of the solid, light-transmissive spacers 524 can prohibit the exterior layers 508, 510 from moving toward each other at the outer edges 502 of the panel 500 when the center of the panel 500 experiences tension.

Though shown in FIG. 5E as ovular, other shapes for the spacers 524 such as circular, square, rectangular, etc. are also possible. The spacers 524 of FIG. 5E are shown as embedded, for example, within the lamination layers 512, 514 and the lamination frame 516, with the spacers 524 becoming a permanent component of the panel 500 after lamination. The spacers 524 could also be temporary in that the spacers 524 are moved into position at the outer edges 502 of the panel 500 between the exterior layers 508, 510 by a jig or fixture such that the spacers 524 can be removed after lamination of the panel 500 is complete. In the case of removable spacers 524, the material that forms the spacers 524 need not be light-transmissive. In the case of embedded or permanent spacers 524, the spacers 524 can be formed of solid, light-transmissive, inert materials.

Figure 6:
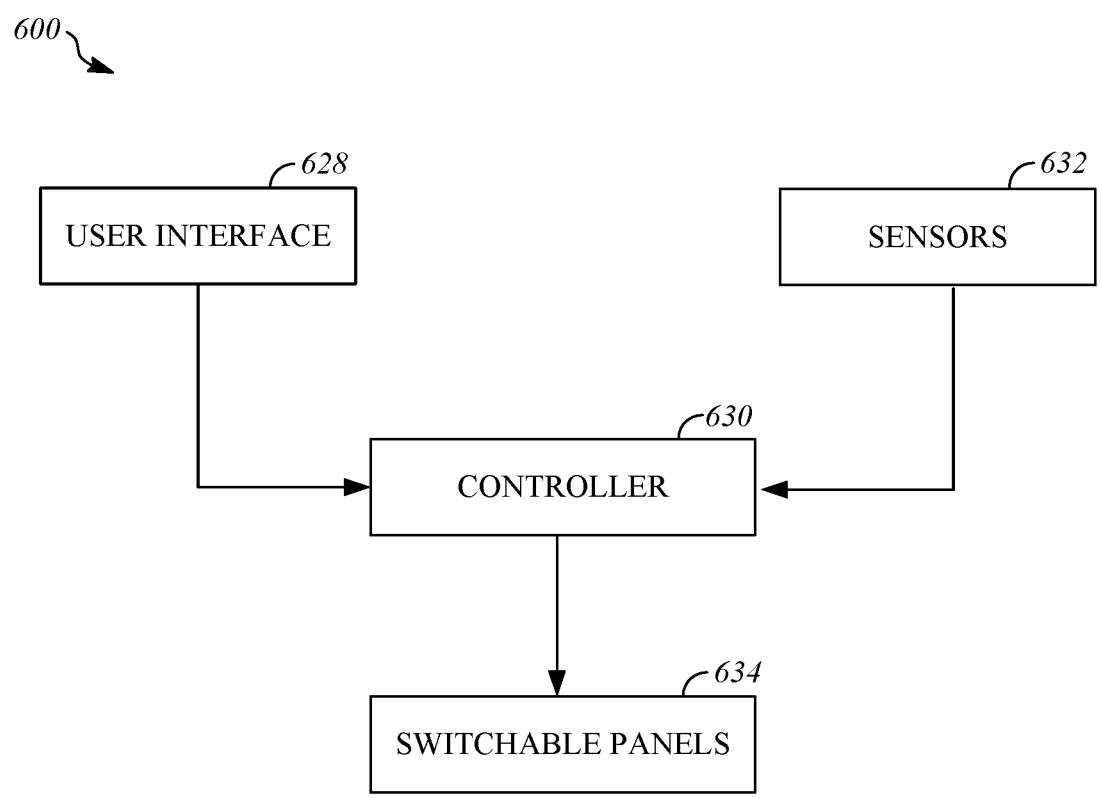
FIG. 6 is a block diagram that shows a panel control system.

FIG. 6 is a block diagram that shows a switchable panel system 600. The switchable panel system 600 may include a user interface 628, a controller 630, sensors 632, and one or more switchable panels 634, such as the panels 200, 500 described above.

The user interface 628 allows a user to modify aspects of the operation of the switchable panel system 600 and to set a desired state for the switchable panel system 600, such as a state of privacy or a state of transparency associated with the switchable panels 634. That it, the user interface 628 can allow modification of operating parameters of the switchable panels 634, for example, based on user preferences.

The controller 630 coordinates operation of the various components of the switchable panel system 600 by communicating electronically (e.g., using wired or wireless communications) with the user interface 628, the sensors 632, and the switchable panels 634. The controller 630 may receive information (e.g., signals and/or data) from the user interface 628, from the sensors 632, and/or from other components (not shown) of the switchable panel system 600.

The sensors 632 may capture or receive information related, for example, to an external environment where the switchable panel system 600 is located. The external environment can be an exterior or an interior of a vehicle or an office, and information captured or received by the sensors 632 can relate to weather, such as a presence of rain or sunshine, or lighting conditions, such as a use of lighting by occupants within the vehicle or the office.

The switchable panel system 600 can change an amount of light transmission through the switchable panels 634 based on a control signal, such as a signal from the controller 630. The control signal may cause the switchable panels 634 to modify a current light transmission characteristic, for example, from a first light transmission value to a second light transmission value that is different than the first light transmission value, or from a light transmitting state to a light blocking or reflecting (mirror) state. Technologies that may be used to implement the switchable panels 634 include switchable components such as suspended particle devices, electrochromic devices, polymer dispersed liquid crystal devices, and guest host liquid crystal devices.

Figure 7:
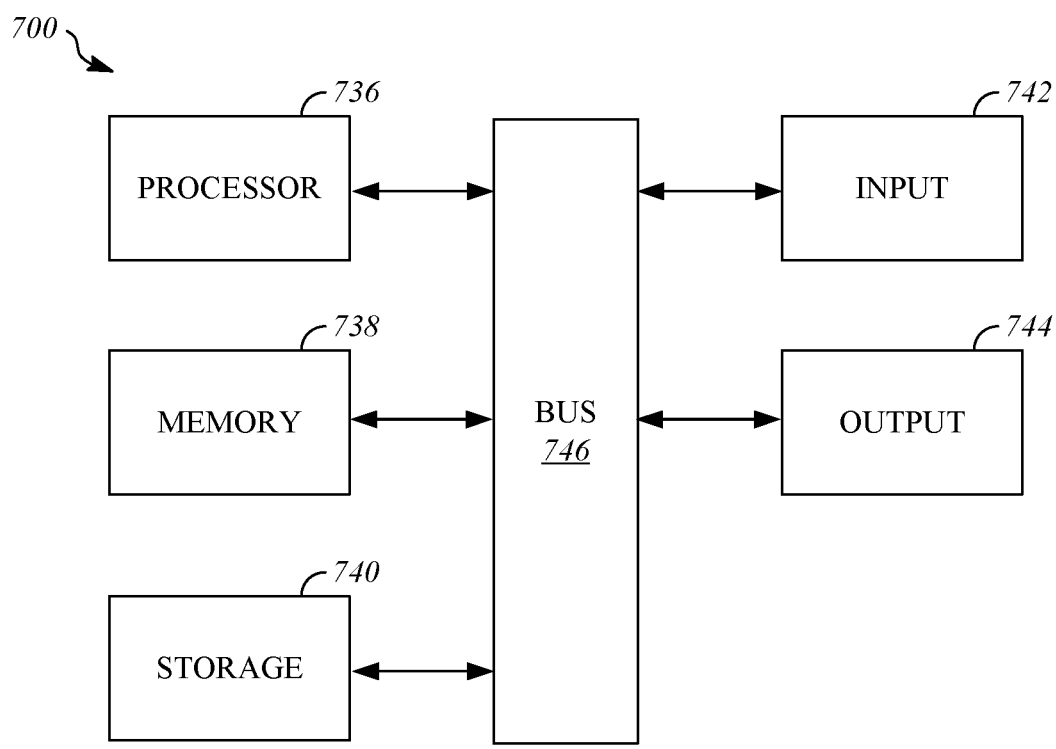
FIG. 7 is an illustration showing an example of a hardware configuration for a controller.

FIG. 7 shows an example of a hardware configuration for a controller 700 that may be used to implement the controller 630 and/or other portions of the switchable panel system 600. In the illustrated example, the controller 700 includes a processor 736, a memory device 738, a storage device 740, one or more input devices 742, and one or more output devices 744. These components may be interconnected by hardware such as a bus 746 that allows communication between the components.

The processor 736 may be a conventional device such as a central processing unit and is operable to execute computer program instructions and perform operations described by the computer program instructions. The memory device 738 may be a volatile, high-speed, short-term information storage device such as a random-access memory module. The storage device 740 may be a non-volatile information storage device such as a hard drive or a solid-state drive. The input devices 742 may include sensors and/or any type of human-machine interface, such as buttons, switches, a keyboard, a mouse, a touchscreen input device, a gestural input device, or an audio input device. The output devices 744 may include any type of device operable to provide an indication to a user regarding an operating state, such as a display screen, a switchable panel, or an audio output.

As described above, one aspect of the present technology is the gathering and use of data available from various sources, such as from sensors 632 or user profiles, to improve the function of switchable panels such as panels 200, 500. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used to deliver changes to light-transmission through switchable panels to best match user privacy preferences. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based light transmission through a switchable panel, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in light transmission through switchable panels can be implemented for a given user by inferring user preferences based on non-personal information data, a bare minimum amount of personal information, other non-personal information available to the device, or publicly available information.

What is claimed is:

1. A panel, comprising:
   a first exterior layer and a second exterior layer;
   a switchable component disposed between the first exterior layer and the second exterior layer;
   a first spacer having an elongated body having an ovular shape, the ovular shape comprising distal ends, each of the distal ends of the first spacer adhered to opposing interior surfaces of the switchable component;
   a lamination frame extending from an outer edge of the switchable component to an outer edge of the panel between the first exterior layer and the second exterior layer; and
   a second spacer having an elongated body having an ovular shape, the ovular shape comprising distal ends, each of distal ends of the second spacer embedded within the lamination frame,
   wherein the first spacer and the second spacer are configured to prohibit the first exterior layer and the second exterior layer from moving toward each other at the outer edge of the panel when a central portion of the panel experiences tension.

2. The panel of claim 1, further comprising:
a first lamination layer and a second lamination layer disposed between the lamination frame and the first exterior layer and the second exterior layer.

3. The panel of claim 2, wherein the second spacer has a height that extends from the first exterior layer, across the first lamination layer, the second lamination layer, and the lamination frame, to the second exterior layer.

4. The panel of claim 2, wherein the lamination frame is formed from a material having a stiffness greater than a stiffness of a material that forms the first lamination layer and the second lamination layer.

5. The panel of claim 2, further comprising:
an electrical connection extending from the outer edge of the switchable component along at least one of the first lamination layer or the second lamination layer and beyond the outer edge of the panel, the electrical connection providing control signals to the switchable component.

6. The panel of claim 2, wherein the lamination frame is formed from PET and the first lamination layer and the second lamination layer are formed from PVB.

7. The panel of claim 2, wherein the first lamination layer and the second lamination layer each comprise at least one of PVB, PET, or another heat-softened, adhesive, light-transmissive material.

8. The panel of claim 1, wherein the switchable component is a liquid crystal (LC) film, the LC film comprising:
a first LC exterior layer and a second LC exterior layer; and
an LC interior layer disposed between the first LC exterior layer and the second LC exterior layer, formed of a viscous material, and having a cell gap height.

9. The panel of claim 8, wherein the second spacer is disposed within the LC interior layer, wherein the second spacer disposed within the LC interior layer extends across the cell gap height between the first LC exterior layer and the second LC exterior layer, and wherein the viscous material is able to flow around the second spacer disposed within the LC interior layer.

10. The panel of claim 1, wherein the first exterior layer and the second exterior layer each comprise at least one of glass, polycarbonate, or another solid, light-transmissive material.

11. A panel, comprising:
a first exterior layer and a second exterior layer spaced apart a predetermined distance;
a first lamination layer and a second lamination layer disposed between the first exterior layer and the second exterior layer and extending to an outer edge of the panel;
a switchable component disposed between the first lamination layer and the second lamination layer;
a spacer having an elongated body and an ovular shape with distal ends adhered to opposing interior surfaces of the switchable component,
wherein a position of the spacer is fixed, and
wherein the spacer prohibits the first exterior layer and the second exterior layer from moving toward each other at the outer edge of the panel when a central portion of the panel experiences tension to maintain at least ninety percent of the predetermined distance between the first exterior layer and the second exterior layer at the outer edge of the panel; and
a lamination frame extending from an outer edge of the switchable component to the outer edge of the panel between the first lamination layer and the second lamination layer,
wherein the lamination frame is formed from a material having a stiffness greater than a stiffness of a material that forms the first lamination layer and the second lamination layer.

12. The panel of claim 11, wherein the lamination frame is formed from PET and the first lamination layer and the second lamination layer are formed from PVB.

13. The panel of claim 11, wherein the switchable component is a liquid crystal (LC) film, the LC film comprising:
a first LC exterior layer and a second LC exterior layer; and
a LC interior layer disposed between the first LC exterior layer and the second LC exterior layer,
wherein the spacer is disposed within the LC interior layer, and wherein viscous material within the LC interior layer is able to flow around the spacer.

14. The panel of claim 13, wherein the spacer has a pair of distal ends, and wherein one of the distal ends is bonded to the first LC exterior layer of the switchable component and another of the distal ends is bonded to the second LC exterior layer of the switchable component.

15. The panel of claim 11, further comprising:
an electrical connection extending from the outer edge of the switchable component along at least one of the first lamination layer or the second lamination layer and beyond the outer edge of the panel, the electrical connection providing control signals to the switchable component.

16. A panel, comprising:
a first panel exterior layer spaced apart a predetermined distance from a second panel exterior layer; and
a switchable component disposed between the first panel exterior layer and the second panel exterior layer, the switchable component comprising:
a first switchable component exterior layer and a second switchable component exterior layer;
a liquid crystal (LC) interior layer including a viscous material and disposed between the first switchable component exterior layer and the second switchable component exterior layer; and
switchable component spacers, each switchable component spacer having an elongated, ovoid shape with opposing distal ends that are anchored to opposing interior surfaces of the first switchable component exterior layer and the second switchable component exterior layer at a fixed location within the LC interior layer that is spaced from a location of another one of the switchable component spacers,
wherein the viscous material flows around the switchable component spacers, and
wherein the switchable component spacers prohibit tension experienced by a central portion of the panel from causing a change in the predetermined distance of greater than ten percent.

17. The panel of claim 16, wherein each of the opposing distal ends is bonded to one of the respective opposing interior surfaces of the first switchable component exterior layer or the second switchable component exterior layer.

18. The panel of claim 16, further comprising:
a first lamination layer disposed between the switchable component and the first panel exterior layer; and
a second lamination layer disposed between the switchable component and the second panel exterior layer.

19. The panel of claim 18, further comprising:
a lamination frame extending from an outer edge of the switchable component to an outer edge of the panel between the first lamination layer and the second lamination layer; and
a frame spacer embedded within the lamination frame, the frame spacer embedded within the lamination frame, having an elongated body having an ovular shape and opposing distal ends, and configured to prohibit the first panel exterior layer and the second panel exterior layer from moving toward each other at the outer edge of the panel when the central portion of the panel experiences tension.

20. The panel of claim 19, wherein the frame spacer embedded within the lamination frame has a height that extends from the first panel exterior layer, across the first lamination layer, the second lamination layer, and the lamination frame, to the second panel exterior layer.

\* \* \* \* \*